US010339606B2

(12) United States Patent
Gupta et al.

(10) Patent No.: US 10,339,606 B2
(45) Date of Patent: Jul. 2, 2019

(54) SYSTEMS AND METHODS FOR AN AUTOMATICALLY-UPDATING FRAUD DETECTION VARIABLE

(71) Applicant: American Express Travel Related Services Company, Inc., New York, NY (US)

(72) Inventors: Kamal Gupta, Bengaluru (IN); Vidit Jain, Bengalore (IN)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 284 days.

(21) Appl. No.: 15/258,880

(22) Filed: Sep. 7, 2016

(65) Prior Publication Data
US 2018/0068395 A1 Mar. 8, 2018

(51) Int. Cl.
G06N 3/08 (2006.01)
G06Q 40/00 (2012.01)

(52) U.S. Cl.
CPC ............... G06Q 40/12 (2013.12); G06N 3/08 (2013.01)

(58) Field of Classification Search
USPC ........................................................ 705/30
See application file for complete search history.

(56) References Cited

U.S. PATENT DOCUMENTS

2014/0310159 A1* 10/2014 Zoldi ................. G06Q 20/4016
705/39
2015/0261846 A1* 9/2015 Hall .................... G06F 16/2425
707/738

* cited by examiner

Primary Examiner — Garcia Ade
(74) Attorney, Agent, or Firm — Snell & Wilmer, L.L.P.

(57) ABSTRACT

The systems and methods herein may include receiving a plurality of transactions for a plurality of consumers, wherein each respective transaction of the plurality of transactions is between a consumer of the plurality of consumers and a merchant of a plurality of merchants; automatically inputting the plurality of transactions into a neural network; automatically analyzing the plurality of transactions over a plurality of iterations, wherein an iteration of the plurality of iterations comprises cycling through a consumer transaction history associated with the consumer, wherein the consumer transaction history has a consumer transaction sequence associated with the consumer; and automatically updating over the plurality of iterations, a previous fraud detection variable associated with the consumer and/or the merchant to generate updated fraud detection variables, in response to the analyzing the plurality of transactions.

17 Claims, 8 Drawing Sheets

| Transaction Log 240 | | | | | | | |
|---|---|---|---|---|---|---|---|
| | | | | Time → | | | |
| | T1 | T2 | T3 | T4 | T5 | T6 | T7 |
| 241 | CM$_1$ | M1 | | | | | | M1 |
| 242 | CM$_2$ | M2 | M1 | | M1 | | M5 | M4 |
| 243 | CM$_3$ | | | M3 | | M2 | | M4 |
| 244 | CM$_4$ | | M3 | | M2 | | | |

FIG. 2A

| Aggregated Transaction Log 340 | | | | | | |
|---|---|---|---|---|---|---|
| 341 | CM$_1$ | M$_1$(0) | | M$_1$(1) | | |
| 342 | CM$_2$ | M$_2$(0) | M$_2$(1) | M$_2$(2) | M$_2$(3) | M$_2$(4) |
| 343 | CM$_3$ | M$_3$(0) | | M$_3$(1) | M$_3$(2) | |
| 344 | CM$_4$ | M$_4$(0) | | M$_4$(1) | | |

FIG. 2B

SYSTEMS AND METHODS FOR AN AUTOMATICALLY-UPDATING FRAUD DETECTION VARIABLE

FIELD

The present disclosure generally relates to fraud detection for transactions, and more specifically, to an automatically-updating fraud detection variable configured to aid in fraud detection.

BACKGROUND

Transaction account issuers attempt to identify and reject fraudulent authorization requests in order to reduce fraud. Traditionally, a merchant submits an authorization request to the transaction account issuer to complete a transaction. The authorization request typically contained information that identifies the transaction account of a consumer (e.g., an account identifier) and the merchant (e.g., a merchant identifier).

To detect fraud, transaction account issuers may create fraud detection variables used for fraud detection based on the transaction history and/or transaction pattern of each consumer and/or each merchant. The fraud detection variables may be used to predict whether a transaction is fraudulent in response to an authorization request for a transaction being received from a merchant. The fraud detection variables must be updated periodically to increase their fraud detection effectiveness, and/or to reflect new transaction information between consumers and merchants received by the transaction account issuers. Updating the fraud detection variables may be completed manually, which may be an onerous process. As such, with updating fraud detection variables being traditionally difficult and time-consuming, the fraud detection variables may not be updated as often as would be optimal to create the most effective fraud detection variables, and to reflect the most current transaction history received by the transaction account issuers.

SUMMARY

A system, method, and article of manufacture (collectively, "the system") are disclosed relating to an automatically-updating fraud detection variable. In various embodiments, the system may be configured to perform operations including receiving, by a processor, a plurality of transactions for a plurality of consumers, wherein each respective transaction of the plurality of transactions is between a consumer of the plurality of consumers and a merchant of a plurality of merchants; automatically inputting, by the processor, the plurality of transactions into a neural network; automatically analyzing, by the process using the neural network, the plurality of transactions over a plurality of iterations, wherein an iteration of the plurality of iterations comprises cycling, by the processor using the neural network, through a consumer transaction history associated with the consumer, wherein the consumer transaction history has a consumer transaction sequence associated with the consumer; and automatically updating, by the processor using the neural network, over the plurality of iterations, a previous fraud detection variable associated with at least one of the consumer or the merchant to generate updated fraud detection variables, in response to the analyzing the plurality of transactions. In various embodiments, the analyzing the plurality of transactions and the updating previous fraud detection variables repeat automatically such that the updated fraud detection variables associated with at least one of the consumer or the merchant are continuously generated.

In various embodiments, cycling through the consumer transaction history may comprise retrieving, by the processor, a sliding window number of transactions preceding, in the consumer transaction sequence, a transaction in the consumer transaction history, wherein the sliding window number of transactions are retrieved from a previous iteration of the plurality of iterations, wherein the sliding window number of transactions is a positive integer of transactions; inputting, by the processor, the sliding window number of transactions preceding the transaction into the neural network as a set of transaction inputs for the transaction; designating, by the processor and the neural network, the transaction in the consumer transaction history as a desired transaction output of the neural network associated with the set of transaction inputs for the transaction; analyzing, by the processor and the neural network, the set of transaction inputs for the transaction to produce a generated transaction output of the neural network; and comparing, by the processor, the generated transaction output and the desired transaction output.

In various embodiments, cycling through the consumer transaction history may comprise retrieving, by the processor, the previous fraud detection variable associated with the consumer from a previous iteration of the plurality of iterations, wherein the consumer transaction history is a consumer input into the neural network; inputting, by the processor, the previous fraud detection variable into the neural network as a desired consumer output of the neural network for the consumer; analyzing, by the processor and the neural network, the consumer transaction history to generate a generated consumer output of the neural network; and comparing, by the processor, the generated consumer output and the desired consumer output.

In various embodiments, cycling through the consumer transaction history may comprise retrieving, by the processor, the previous fraud detection variable associated with the merchant from a previous iteration of the plurality of iterations, wherein a merchant transaction history is a merchant input into the neural network; inputting, by the processor, the previous fraud detection variables into the neural network as a desired merchant output for the merchant; analyzing, by the processor and the neural network, the merchant transaction history to produce a generated merchant output of the neural network; and comparing, by the processor, the generated merchant output and the desired merchant output.

In various embodiments, the operations may further comprise storing, by the processor, the updated fraud detection variables associated with at least one of the consumer or the merchant. In various embodiments, the operations may further comprise receiving, by the processor, an authorization request for a transaction between the consumer and the merchant; analyzing, by the processor, the transaction for fraud by applying an updated fraud detection variable associated with at least one of the consumer or the merchant involved in the transaction; and sending, by the processor, an authorization response in response to the analyzing the transaction.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 2A depicts a transaction log of transactions between various consumers and merchants, in accordance with various embodiments;

FIG. 2B depicts an aggregated transaction log of transactions between various consumers and merchants, in accordance with various embodiments;

DETAILED DESCRIPTION

The detailed description of various embodiments makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
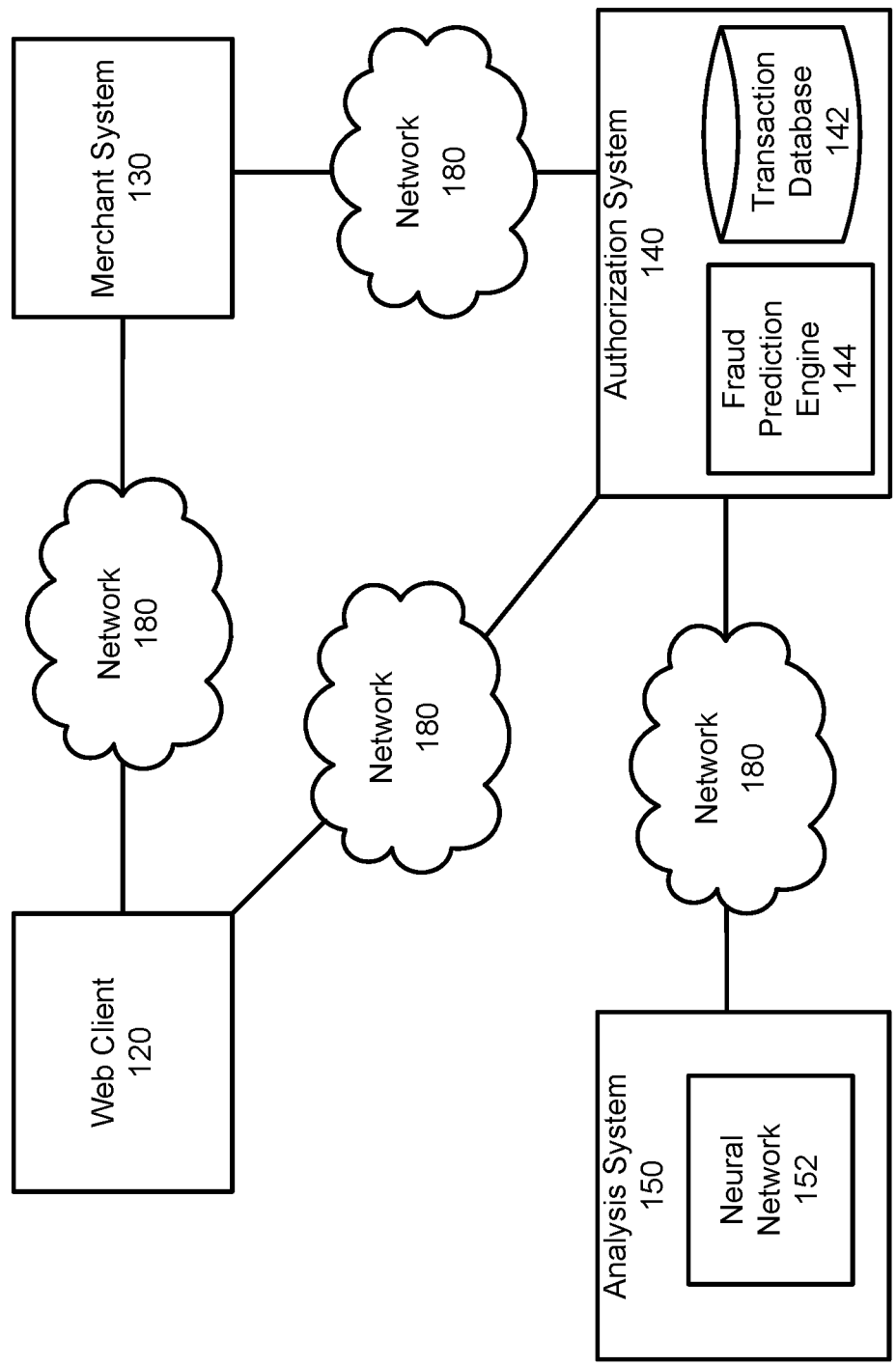
FIG. 1 depicts an exemplary system for automatically updating fraud detection variables, in accordance with various embodiments.

In various embodiments, and with reference to FIG. 1, an exemplary system for updating fraud detection variables is disclosed. In various embodiments, system 100 may comprise a web client 120, a merchant system 130, an authorization system 140, and/or an analysis system 150. All or any subset of components of system 100 may be in communication with one another via a network 180. System 100 may be computer-based, and may comprise a processor, a tangible non-transitory computer-readable memory, and/or a network interface. Instructions stored on the tangible non-transitory memory may allow system 100 to perform various functions, as described herein.

In various embodiments, web client 120 may incorporate hardware and/or software components. For example, web client 120 may comprise a server appliance running a suitable server operating system (e.g., MICROSOFT INTERNET INFORMATION SERVICES or, "IIS"). Web client 120 may be any device that allows a user to communicate with network 180 (e.g., a personal computer, personal digital assistant (e.g., IPHONE®, BLACKBERRY®), cellular phone, kiosk, and/or the like). Web client 120 may be in communication with merchant system 130 and/or authorization system 140 via network 180. Web client 120 may participate in any or all of the functions performed by merchant system 130 and/or authorization system 140 via network 180.

Web client 120 includes any device (e.g., personal computer) which communicates via any network, for example such as those discussed herein. In various embodiments, web client 120 may comprise and/or run a browser, such as MICROSOFT® INTERNET EXPLORER®, MOZILLA® FIREFOX®, GOOGLE® CHROME®, APPLE® Safari, or any other of the myriad software packages available for browsing the internet. For example, the browser may communicate with merchant system 130 via network 180 by using Internet browsing software installed in the browser. The browser may comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. In various embodiments, the browser may be configured to display an electronic channel.

In various embodiments, merchant system 130 may be associated with a merchant, and may incorporate hardware and/or software components. For example, merchant system 130 may comprise a server appliance running a suitable server operating system (e.g., Microsoft Internet Information Services or, "IIS"). Merchant system 130 may be in communication with web client 120 and authorization system 140. In various embodiments, merchant system 130 may comprise a merchant identifier (MID) which is specific to the merchant. The MID may be a number, or any other suitable identifier, specific to the merchant that identifies the merchant in a transaction. In various embodiments, merchant system 130 may comprise an online store, which consumers may access through the browser on web client 120 to purchase goods or services from the merchant.

In various embodiments, authorization system 140 may be associated with a transaction account issuer, an entity that issues transaction accounts to customers (i.e., consumers) such as credit cards, bank accounts, etc. Authorization system 140 may comprise hardware and/or software capable of storing data and/or analyzing information. Authorization system 140 may comprise a server appliance running a suitable server operating system (e.g., MICROSOFT INTERNET INFORMATION SERVICES or, "IIS") and having database software (e.g., ORACLE) installed thereon. Authorization system 140 may be in electronic communication with web client 120, merchant system 130, and/or analysis system 150. In various embodiments, Authorization system 140 may comprise software and hardware capable of accepting, generating, receiving, processing, and/or analyzing information related to completing transactions and fraud detection.

In various embodiments, authorization system 140 may comprise a transaction database 142. Transaction database 142 may be configured to receive and store transaction information from transactions completed between merchants and consumers. The merchants involved in the transactions may be associated with the transaction account issuer that is associated with authorization system 140, and the consumers involved in the transactions may hold transaction accounts issued from the transaction account issuer that is associated with authorization system 140.

With reference to FIGS. 1, 2A, and 2B, transaction database 142 may store transaction information in a transaction log 240. The transaction information for each consumer ($CM_1$-$CM_4$) may be logged in a time sequence 241-244. Each transaction between a consumer and a merchant (M) may be logged in transaction log 240 at a time interval (depicted as time intervals T1-T7 in FIG. 2A) at which the transaction takes place in the time sequence. As an example, referring to FIG. 2A, in time sequence 242, consumer $CM_2$ completed a transaction with Merchant M5 at time interval T6. In various embodiments, transaction database 142 may remove the time differences between any two transactions to generate an aggregated transaction log 340. Aggregated transaction log 340 shows the consumer transaction sequences 341-344 for each consumer $CM_1$-$CM_4$, which is meant to illustrate the order of merchants a consumer transacts with, regardless of the timing of the transactions. As an explanation of the notation in FIG. 2B, $M_i(t)$ represents the merchant that the consumer transacted with, where i is the consumer identifier (i.e., i=2 means a transaction by consumer $CM_2$) and t is the transaction in the consumer transaction sequence (i.e., t=2 means the third transaction in the consumer transaction sequence for that consumer). Therefore, as an illustration, $M_2(2)$ in consumer transaction sequence 342 represents the value, i.e., the merchant, for the third transaction made by consumer $CM_2$: M1 (depicted in transaction log 240 in time sequence 242 at time interval T4. In various embodiments, transaction database 142 may store the time sequence and/or consumer transaction sequence of the transaction history of consumers.

In various embodiments, authorization system 140 may comprise a fraud prediction engine 144. Fraud prediction engine 144 may be configured to receive an authorization request to complete a transaction from merchant system 130 and/or authorization system 140. The authorization request may comprise a merchant identifier(s) (e.g., an MID) and consumer identifier(s) (i.e., a transaction account identifier such as an account number, a consumer profile, etc.). Fraud prediction engine 144 may apply a fraud detection variable(s) associated with the consumer and/or the merchant in the transaction to the authorization request in order to determine the probability that the subject transaction is fraudulent.

In various embodiments, analysis system 150 may comprise hardware and/or software capable of storing data and/or analyzing information. Analysis system 150 may comprise a server appliance running a suitable server operating system (e.g., MICROSOFT INTERNET INFORMATION SERVICES or, "IIS") and having database software (e.g., ORACLE) installed thereon. Analysis system 150 may be in electronic communication with authorization system 140, and in various embodiments, analysis system 150 and authorization system 140 may be integral, i.e., authorization system 140 may comprise analysis system 150. Stated another way, one server may serve as, and perform the operations of, analysis system 150 and authorization system 140. Analysis system 150 may be configured to generate and/or update fraud detection variables which may be used by fraud prediction engine 144 to detect fraudulent transactions. Fraud detection variables may be multidimensional variables (i.e., sequences of numbers or data, which create a vector) associated with each consumer and/or merchant involved in a transaction, which may comprise a fraud detection value. The fraud detection variables for each consumer and/or merchant may reflect transactions patterns (i.e., the order to merchants a consumer transacted with, or the order of consumers a merchant transacted with) of the associated consumer and/or merchant. In various embodiments, analysis system 150 may be associated with a transaction account issuer.

Figure 3:
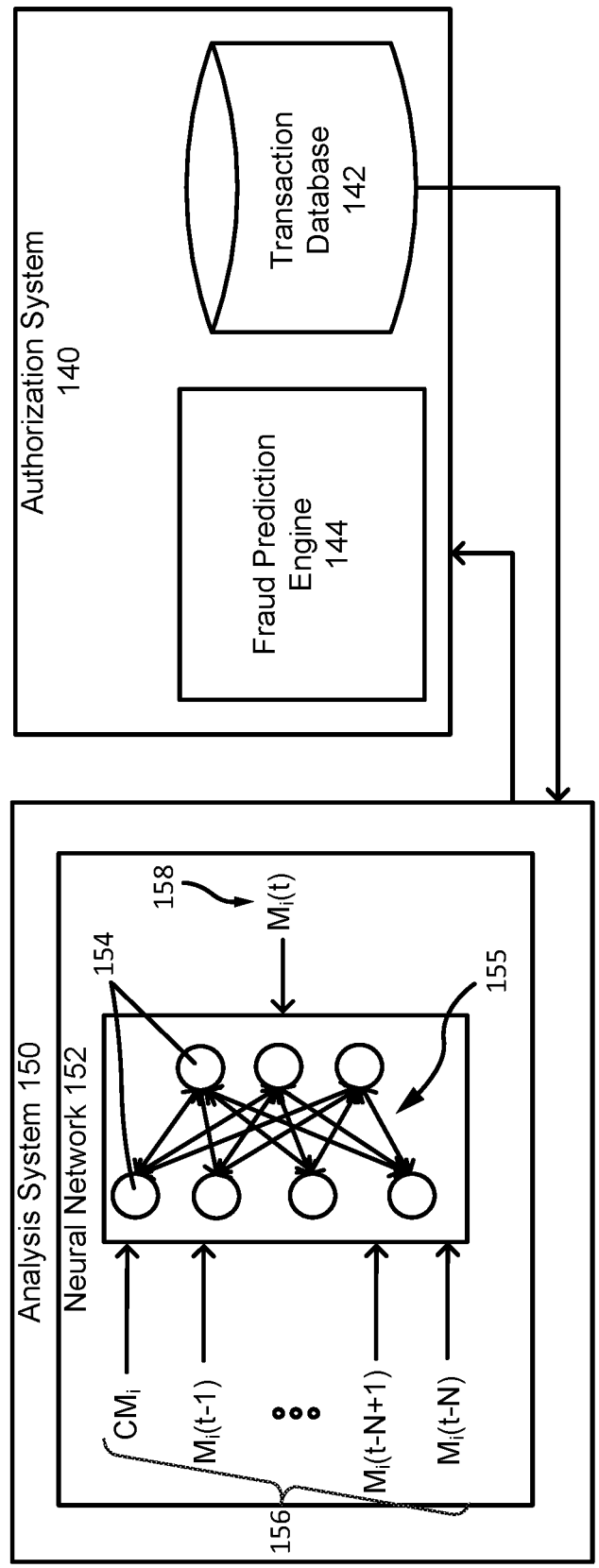
FIG. 3 depicts an analysis system and an authorization system, in accordance with various embodiments.

In various embodiments, analysis system 150 may comprise a neural network 152, which is configured to receive and process input information to generate and/or update the fraud detection variables. With reference to FIG. 3, neural network 152 may comprise nodes 154, which are processing elements that are connected to form neural network 152, and directed edges 155, which are signals sent between nodes 154. Nodes 154 may denote an aggregator/summarizer operator (i.e., summation of incidental signals from directed edges 155). Directed edges 155 may each comprise a weight (i.e., a relative importance) associated with them configured to influence the way in which neural network 152 processes the information associated with each directed edge 155 between nodes 154. In various embodiments, in order to train neural network 152 to generate accurate fraud detection variables, neural network 152 may receive inputs 156 for neural network 152 to analyze. As depicted in FIG. 3, inputs 156 may be a set of inputs reflecting a sliding window number of transactions, described further in reference to FIG. 5A herein. Similar to the notation described in association with FIG. 2B, inputs 156 may include the consumer transaction history for a consumer $CM_i$, where i is the consumer identifier (e.g., numbers 1-4 in FIGS. 2A and 2B), t is the transaction in the consumer transaction sequence, and N is the sliding window number of transactions used as inputs into neural network 152. Neural network 152 may also receive a desired output 158, which is the output of neural network 152 that is desired after analyzing inputs 156. Desired output 159, as depicted in FIG. 3, is the transaction being analyzed, $M_i(t)$. Despite inputs 156 and desired output 158 depicted in FIG. 3 having specific notation and associated values, inputs 156 and desired output 158 may be any suitable inputs for, and desired output from, neural network 152. In various embodiments, the generated and/or updated fraud detection variables for each consumer and/or merchant may be stored on analysis system 150 and/or transmitted to and stored in authorization system 140 to use in fraud prediction engine 144 to detect fraudulent transactions.

In various embodiments, network 180 may be an open network or a closed loop network. The open network may be a network that is accessible by various third parties. In this regard, the open network may be the internet, a typical transaction network, and/or the like. Network 180 may also be a closed network. In this regard, network 180 may be a closed loop network like the network operated by American Express. Moreover, the closed loop network may be configured with enhanced security and monitoring capability. For example, the closed network may be configured with tokenization, associated domain controls, and/or other enhanced security protocols. In this regard, network 180 may be configured to monitor users on network 180. In this regard, the closed loop network may be a secure network and may be an environment that can be monitored, having enhanced security features.

Figure 4:
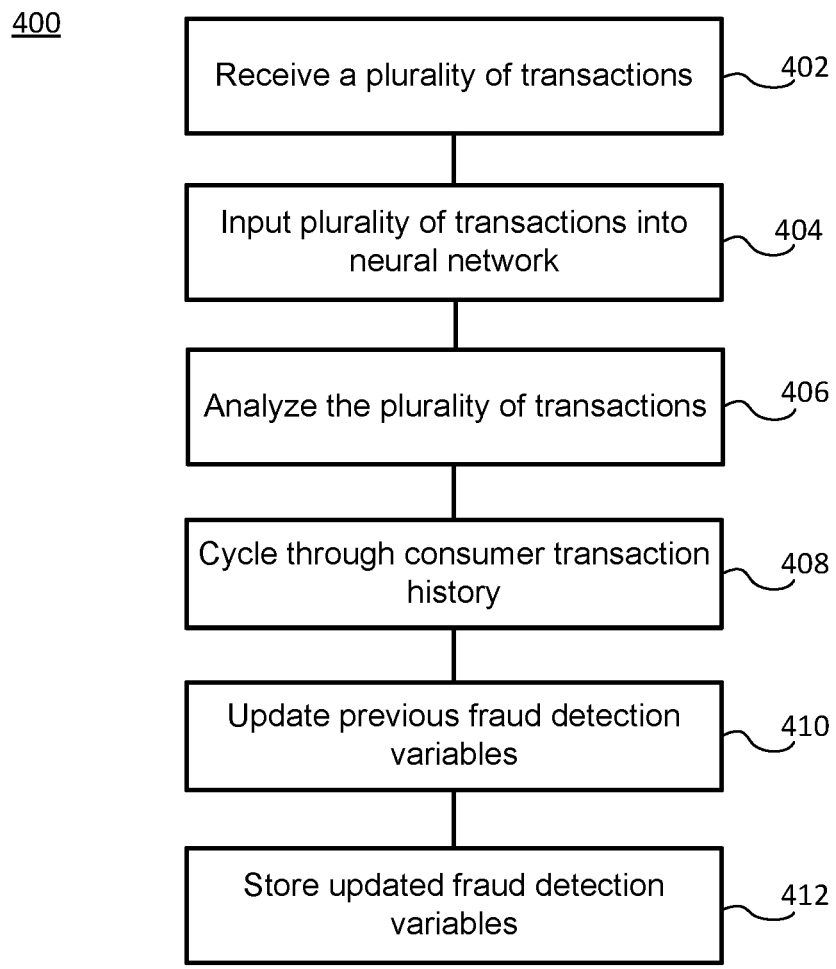
FIG. 4 depicts an exemplary method for generating fraud detection variables, in accordance with various embodiments.
Figure 5A:
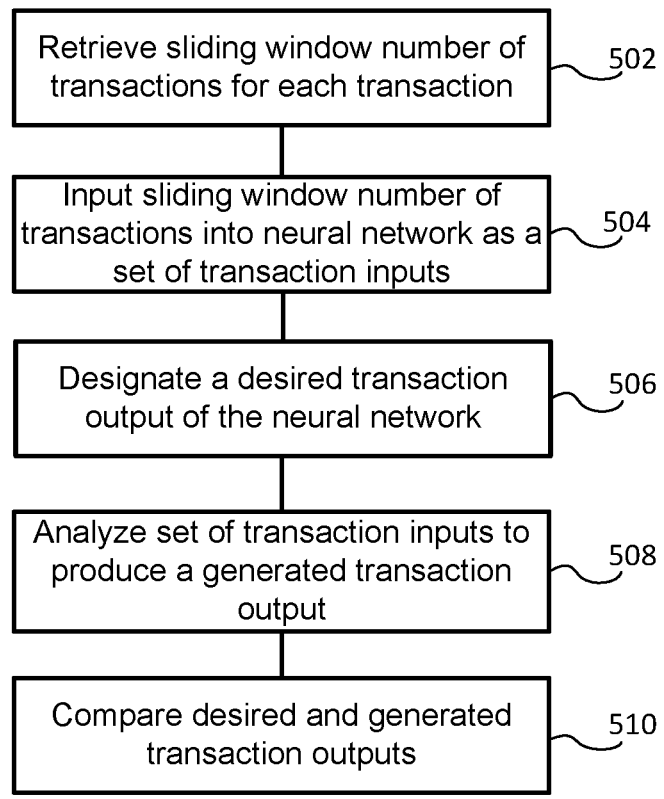
FIGS. 5A-5C depict exemplary methods for cycling through the transaction history of a consumer by a neural network, in accordance with various embodiments.
Figure 5B:
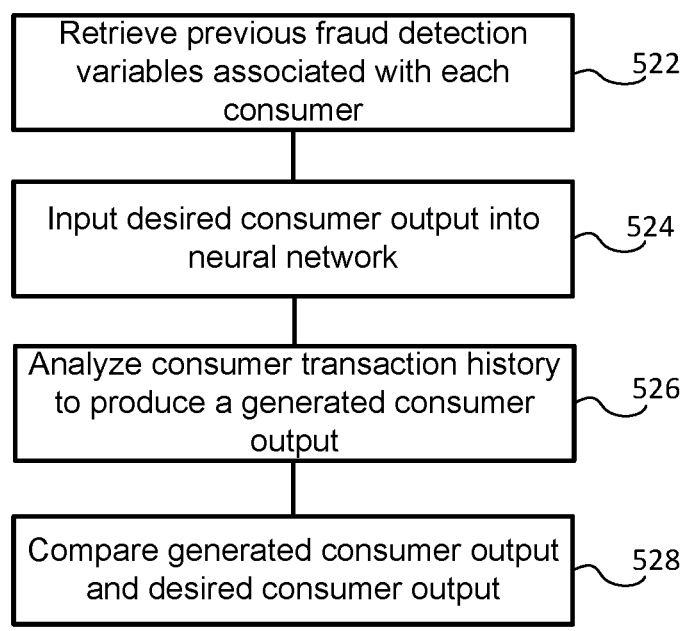
Figure 5C:
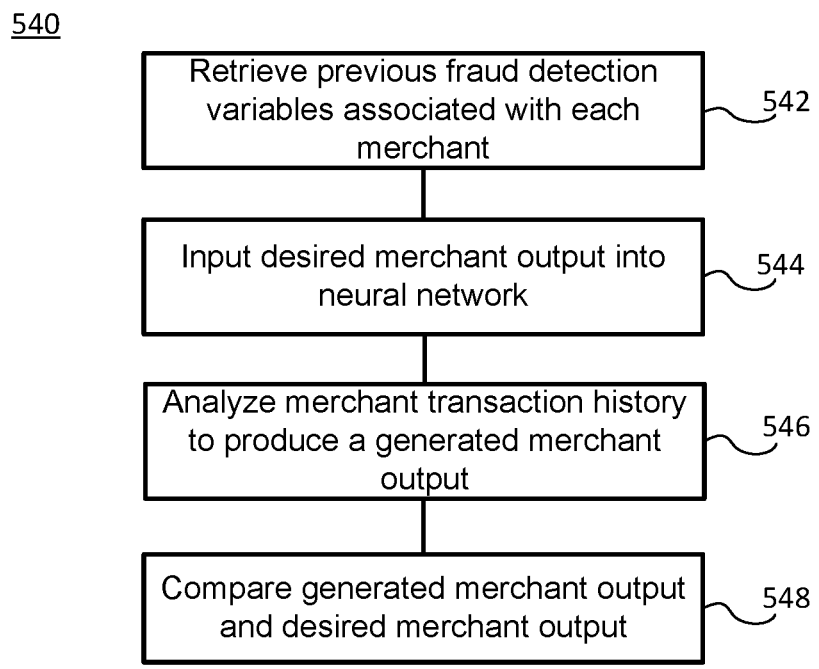
Figure 6:
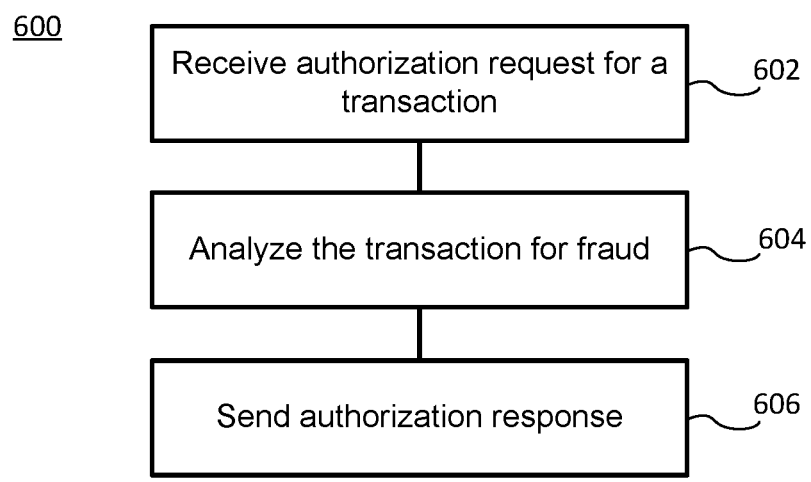
FIG. 6 depicts an exemplary method for authorizing a transaction, in accordance with various embodiments.

With respect to FIGS. 4-6, the process flows depicted are merely embodiments of various embodiments, and are not intended to limit the scope of the disclosure. For example, the steps recited in any of the method or process descriptions may be executed in any order and are not limited to the order presented. It will be appreciated that the description herein makes appropriate references not only to the steps and consumer interface elements depicted in FIG. 4-6, but also to the various system components as described above with reference to FIGS. 1, 2A, 2B, and 3.

In accordance with various embodiments, FIG. 4 depicts a method 400 for generating and/or updating fraud detection variables. In various embodiments, fraud detection variables may be initially created for consumers and/or merchants by randomly selecting values to create random transaction patterns. Method 400 may then be implemented to continuously update the fraud detection variables. With combined reference to FIGS. 1, 3, and 4, authorization system 140 and/or analysis system 150 may receive a plurality of transactions (step 402), i.e., the transaction information for a plurality of consumers. Each of the plurality of transactions may be between a merchant of a plurality of merchants and a consumer to the plurality of consumers. The transaction may have been completed in-person or electronically via web client 120 and merchant system 130. Each transaction may identify the consumer by a consumer identifier or a transaction account identifier, and identify the merchant by a merchant identifier. The transactions may be stored in transaction database 142 in a time sequence, such as the transactions depicted transaction log 240 (FIG. 2A), or in a transaction sequence, such as the transactions depicted in aggregated transaction log 340 (FIG. 2B). Authorization system 140 and/or analysis system 150 may aggregate the transactions in a transaction log 240 to remove the time differences between transactions to create an aggregated transaction log 340 (FIG. 2B).

In various embodiments, the plurality of transactions may be input into neural network 152 (step 404) by authorization system 140 and/or analysis system 150 as inputs 156. Neural network 152 may analyze the plurality of transactions (step 406) over one or more iterations. An iteration may comprise neural network 152 cycling through the consumer transaction history (step 408) of every consumer, wherein the consumer transaction history of every consumer has a consumer transaction sequence such as consumer transaction sequences 341-344 in aggregated transaction log 340 (FIG. 2B). Steps 410 and 412 will be discussed subsequently herein.

In accordance with various embodiments, FIG. 5A illustrates a method 500 for cycling through the consumer transaction history associated with each consumer of the plurality of consumers. With combined reference to FIGS. 1, 3, and 5A, in various embodiments, for each transaction in the consumer transaction history associated with each consumer, a sliding window number (denoted as N in FIG. 3) of transactions may be retrieved (step 502) from a previous iteration of analyzing the plurality of transactions. The sliding window number may be a positive integer of transactions that preceded each transaction in the consumer transaction sequence from the previous iteration. So for each transaction, $M_i(t)$, a sliding window number of transactions is retrieved from a previous iteration, $M_i(t-1)$ to $M_i(t-N)$. As an illustrative example, say, during the current iteration of analyzing the transactions for a consumer, neural network 152 is cycling through the consumer transaction history associated with a particular consumer. The sliding window number, N, is five (5), so N will have the values of one (1) to five (5). For the twentieth ($20^{th}$) transaction ($M_i(t)$ where t=19) in the consumer transaction sequence for a consumer, $CM_i$, analysis system 150 may retrieve transactions 15 through 19 in the consumer transaction sequence ($M_i(14)$ to $M_i(18)$) from the previous iteration of analyzing the transactions, as the sliding window number of transactions. For the twenty-first ($21^{st}$) transaction in the consumer transaction sequence, analysis system 150 may retrieve transactions 16 through 20 in the consumer transaction sequence from the previous iteration of analyzing the transactions, as the sliding window number of transactions (5), and so on.

In various embodiments, the sliding window number of transactions for each transaction, retrieved from the previous iteration for each transaction, may be input into neural network 152 as a set of transaction inputs (step 504), which are inputs 156 depicted in FIG. 3. Each transaction of the plurality of transactions may be designated as a desired transaction output of neural network 152 (step 506) associated with its associated set of transaction inputs (i.e., the sliding window number of inputs). The desired transaction output is the desired output (such as desired output 158 in FIG. 3) of neural network 152 in response to analyzing the associated set of transaction inputs (i.e., the sliding window number of inputs). Referring back to the first example above regarding the $20^{th}$ transaction in a consumer transaction sequence, the value (i.e., the merchant) represented by $M_i(19)$ would be the desired output 158. The transactions have already been input into neural network 152, and accordingly, each transaction, $M_i(t)$, is designated as a desired output rather than input into neural network 152, as depicted by desired output 158 in FIG. 3.

In various embodiments, neural network 152 may analyze the set of transaction inputs for each transaction to produce a generated transaction output (step 508). Based on previous iterations of analyzing the plurality of transactions for the plurality of consumers, neural network 152 may be trained to predict each transaction (i.e., the desired transaction output) by analyzing the set of transaction inputs associated with each transaction, to create the generated transaction output. Stated another way, by analyzing the sliding window number of transactions preceding each transaction ($M_i(t-1)$ to $M_i(t-N)$) from a previous iteration (the set of transaction inputs), which may reflect a transaction pattern, neural network 152 may be trained to recognize the transaction pattern and predict the next transaction in the transaction pattern, i.e., the desired transaction output, $M_i(t)$, by producing a generated transaction output.

In response to producing a generated transaction output, neural network 152 may compare the generated transaction output with the desired transaction output (step 510) in order to determine a difference between the two. In response to neural network 152 determining a difference between the desired transaction output and the generated transaction output, neural network 152 may update the previous fraud detection variables (step 410 in of method 400 in FIG. 4) associated with each consumer of the plurality of consumers and/or each merchant of the plurality of merchants. Neural network 152 may update the fraud detection variables by adjusting the weights associated with one or more directed edges 155 to influence the processing of information between nodes 154 within neural network 152. Such an adjustment of directed edges 155 is aimed to more accurately analyze inputs into neural network 152 in order to produce generated transaction outputs more closely resembling desired transaction outputs. Adjustment of weights may be performed through a standard back-propagation algorithm, for example, by the method in *Learning representations by back-propagating errors*, David E. Rumelhard, Geoffrey E. Hinton, and Ronald J. Williams, 323 NATURE, 533-36 (8 Oct. 1986), which is incorporated herein by reference in its entirety.

In accordance with various embodiments, FIG. 5B illustrates another method 520 for cycling through the consumer transaction history associated with each consumer of the plurality of consumers, wherein the consumer transaction history of each consumer is a consumer input into neural network 152. With combined reference to FIGS. 1, 3, and 5B, in various embodiments, analysis system 150 and/or authorization system 140 may retrieve previous fraud detection variables associated with each consumer (step 522) generated from a previous iteration of analyzing the plurality of transactions. The previous fraud detection variables may be the desired consumer outputs (such as desired output 158 in FIG. 3) of neural network 152, which are the outputs that neural network 152 may be trained over various iterations to produce in response to analyzing the consumer inputs (in this case, the consumer transaction history for each consumer). The desired consumer outputs (i.e., the previous fraud detection variables) may be input into neural network 152 (step 524).

In various embodiments, neural network 152 may analyze the consumer transaction history (the consumer input) to produce a generated consumer output (step 526) associated with each consumer. Based on previous iterations of analyzing the plurality of transactions for the plurality of consumers, neural network 152 may be trained to create and/or update the fraud detection variables, and therefore, the generated consumer output is the fraud detection variable output from neural network 152 for each consumer. Neural network 152 may compare the generated consumer output with the desired consumer output (step 528) in order to determine a difference between the two. In response to neural network 152 determining a difference between the desired consumer output and the generated consumer output, neural network 152 may update the previous fraud detection variables (step 410 in of method 400 in FIG. 4) associated with each consumer of the plurality of consumers and/or each merchant of the plurality of merchants. Neural network 152 may update the fraud detection variables by adjusting the weights associated with one or more directed edges 155 to influence the processing of information between nodes 154 within neural network 152. Such an adjustment of directed edges 155 is aimed to more accurately analyze inputs into neural network 152 in order to produce generated consumer outputs more closely resembling desired consumer outputs. Adjustment of weights may be performed through a standard back-propagation algorithm, as described herein.

In accordance with various embodiments, FIG. 5C illustrates yet another method 540 for cycling through the consumer transaction history associated with each consumer of the plurality of consumers, wherein a merchant transaction history associated with each merchant is the merchant input into neural network 152. The merchant transaction history for a merchant may be all transactions that a merchant conducted with various consumers. The merchant transaction history may have a merchant transaction sequence, which may be the order of consumers a merchant transacts with, similar to consumer transaction sequences 341-344 (FIG. 3).

With combined reference to FIGS. 1 and 5C, in various embodiments, analysis system 150 and/or authorization system 140 may retrieve previous fraud detection variables associated with each merchant (step 542) generated from a previous iteration of analyzing the plurality of transactions. The previous fraud detection variables may be desired merchant outputs (such as desired output 158 in FIG. 3) of neural network 152, which are the outputs that neural network 152 may be trained over various iterations to produce in response to analyzing the merchant inputs (in this case, the merchant transaction history for each merchant). The desired merchant outputs (i.e., the previous fraud detection variables) may be input into neural network 152 (step 544).

In various embodiments, neural network 152 may analyze the merchant transaction history to produce a generated merchant output (step 546) associated with each merchant. Based on previous iterations of analyzing the plurality of transactions for the plurality of consumers, neural network 152 may be trained to create and/or update the fraud detection variables, and therefore, the generated merchant output is the fraud detection variable output from neural network 152 for each merchant. Neural network 152 may compare the generated merchant output with the desired merchant output (step 548) in order to determine a difference between the two. In response to neural network 152 determining a difference between the desired merchant output and the generated merchant output, neural network 152 may update the previous fraud detection variables (step 410 in of method 400 in FIG. 4) associated with each consumer of the plurality of consumers and/or each merchant of the plurality of merchants. Neural network 152 may update the fraud detection variables by adjusting the weights associated with one or more directed edges 155 to influence the processing of information between nodes 154 within neural network 152. Such an adjustment of directed edges 155 is aimed to more accurately analyze inputs into neural network 152 in order to produce generated merchant outputs more closely resembling desired merchant outputs. Adjustment of weights may be performed through a standard back-propagation algorithm, as described herein.

In response to neural network 152 analyzing the plurality of transactions (step 406), which may include cycling through the consumer transaction history (step 408) of every consumer employing any one of, or any combination of, methods 500, 520, and/or 540, neural network 152 may update previous fraud detection variables (step 410), as discussed in association with methods 500, 520, and, 540, over one or more iterations. In various embodiments, the fraud detection variables may be updated after each iteration. Step 410 may also include generating updated fraud detection variables.

In various embodiments, any combination of steps 402-410 may occur automatically, continuously, and/or repeatedly, such that the fraud detection variables associated with the each consumer and/or each merchant are continuously updated. The resulting updated fraud detection variables will be more effective at detecting fraud in response to receiving an authorization request for a transaction from a merchant.

In various embodiments, the updated fraud detection variables may be transmitted and stored (step 412) in authorization system 140 and/or analysis system 150 in response to the completion of any desired amount of iterations. Subsequently, the plurality of transactions stored in transaction database 142 may be updated with recent consumer transaction history for each consumer, and/or recent merchant transaction history for each merchant, and steps 402 through 412 may be repeated to provide further updated fraud detection variables associated with consumers and/or merchants. The further updated fraud detection variables are configured to reflect the most recent transaction information, including the most recent plurality of transactions, received by authorization system 140 and/or analysis system 150.

In accordance with various embodiments, FIG. 6 illustrates a method 600 for authorizing transactions. With combined reference to FIGS. 1 and 6, authorization system 140 may receive an authorization request for a transaction (step 602) from merchant system 130 in order to complete a transaction with a consumer. Authorization system 140, via fraud prediction engine 144, may analyze the transaction for fraud (step 604) by applying the updated fraud detection variable for the consumer and/or the merchant in the transaction, which may have been received by authorization system 140 and/or fraud prediction engine 144 from analysis system 150 and/or neural network 152. Authorization system 140 may implement the correct fraud detection variable by matching a merchant identifier associated with the merchant with a merchant identifier associated with the fraud detection variable, and/or by matching a consumer identifier associated with the consumer with a consumer identifier associated with the fraud detection variable.

Consumers and/or merchants having similar fraud detection variables may have similar transaction patterns. Therefore, analyzing the transaction for fraud may comprise comparing the fraud detection variable (indicating a transaction pattern) of the consumer and/or merchant involved in the transaction, with a fraud detection variable of a consumer and/or merchant, respectively, having a transaction pattern. Accordingly, two similar fraud detection variables associated with two consumers having similar consumer transaction patterns may be compared, and/or two similar fraud detection variables associated with two merchants having similar merchants transaction patterns may be compared. Fraud prediction engine 144 may then compute a numerical similarity (i.e., the inverse of the Euclidean distance) between the fraud detection variables of the two consumers and/or the two merchants. Such comparisons between multiple consumers with similar fraud detection variables, and/or between multiple merchants with similar fraud detection variables, may take place between any suitable number of consumers and/or merchants having similar fraud detection variables.

In various embodiments, in response to a minimal numerical similarity between the fraud detection variables of the two consumers and/or the two merchants, fraud prediction engine 144 may determine a high probability of the transaction being fraudulent. In response to a significant numerical similarity between the fraud detection variables of the two consumers and/or the two merchants, fraud prediction engine 144 may determine a low probability of the transaction being fraudulent. In various embodiments, in which a transaction pattern of a consumer and/or merchant has previously been determined to indicated a fraudulent transaction(s), a minimal numerical similarity between the fraud detection variables of the two consumers and/or the two merchants may cause fraud prediction engine 144 to determine a low probability of a fraudulent transaction, and/or a significant numerical similarity between the fraud detection variables of the two consumers and/or the two merchants may cause fraud prediction engine 144 to determine a high probability of a fraudulent transaction.

In various embodiments, in response to analyzing the transaction for fraud (step 604), authorization system 140 may send an authorization response (step 606) to merchant system 130. In response to authorization system 140 determining a low probability of fraud, the authorization response may approve the transaction. In response to authorization system 140 determining a high probability of fraud, the authorization response may reject the transaction.

The various components in system 100 may be independently, separately or collectively suitably coupled to each other, and/or network 180, via data links which include, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

In various embodiments, the system and method may include alerting a subscriber (e.g., a user, consumer, etc.) when their computer is offline. The system may include generating customized information and alerting a remote subscriber that the transaction and/or identifier information can be accessed from their computer. The alerts are generated by filtering received information, building information alerts and formatting the alerts into data blocks based upon subscriber preference information. The data blocks are transmitted to the subscriber's web client 120 which, when connected to a computer, causes the computer to auto-launch an application to display the information alert and provide access to more detailed information about the information alert, which may indicate whether a transaction was approved or rejected by authorization system 140. More particularly, the method may comprise providing a viewer application to a subscriber for installation on a remote subscriber computer and/or web client 120; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generating an information alert from the filtered information that contains a name, a price and a universal resource locator (URL), which specifies the location of the data source; formatting the information alert into data blocks according to said information format; and transmitting the formatted information alert over a wireless communication channel to web client 120 associated with the consumer based upon the destination address and transmission schedule, wherein the alert activates the application to cause the information alert to display on the remote subscriber computer and/or web client 120 and to enable connection via the URL to the data source over the Internet when web client 120 is locally connected to the remote subscriber computer and the remote subscriber computer comes online.

In various embodiments, the system and method may include a graphical user interface (i.e., comprised in web client 120) for dynamically relocating/rescaling obscured textual information of an underlying window to become automatically viewable to the user. Such textual information may be comprised in merchant system 130 and/or any other interface presented to the consumer or user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (comprised in web client 120, for example); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, messages within merchant system 130) to prevent a computer, server, and/or system from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over consumers during affiliate purchase transactions, using a system for co-marketing the "look and feel" of the host web page (e.g., a web page from merchant system 130) with the product-related content information of the advertising merchant's web page. The system can be operated by a third-party outsource provider, who acts as a broker between multiple hosts and merchants. Prior to implementation, a host places links to a merchant's server on the host's web page (e.g., a web page from merchant system 130). The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A consumer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the consumer as associated with the host web page. The server then transmits and presents this composite web page to the consumer so that she effectively remains on the host web page to purchase the item without being redirected to the third party merchant affiliate. Because such composite pages are visually perceived by the consumer as associated with the host web page, they give the consumer the impression that she is viewing pages served by the host. Further, the consumer is able to purchase the item without being redirected to the third party merchant affiliate, thus allowing the host to retain control over the consumer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a fraud detection variable and (ii) a consumer and/or merchant. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.orb/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like). A "consumer profile" or "consumer profile data" may also comprise transaction account information or a consumer identifier(s) associated with the consumer.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

Practitioners will appreciate that web client 120 may or may not be in direct contact with an application server. For example, web client 120 may access the services of an application server through another server and/or hardware component, which may have a direct or indirect connection to an Internet server. For example, web client 120 may communicate with an application server via a load balancer. In various embodiments, access is through a network or the Internet through a commercially-available web-browser software package.

As those skilled in the art will appreciate, web client 120 may include an operating system (e.g., WINDOWS®/CE/Mobile, OS2, UNIX®, LINUX®, SOLARIS®, MacOS, etc.) as well as various conventional support software and drivers typically associated with computers. Web client 120 may include any suitable personal computer, network computer, workstation, personal digital assistant, cellular phone, smart phone, minicomputer, mainframe or the like. Web client 120 can be in a home or business environment with access to a network. In various embodiments, access is through a network or the Internet through a commercially available web-browser software package. Web client 120 may implement security protocols such as Secure Sockets Layer (SSL) and Transport Layer Security (TLS). Web client 120 may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DLIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of web client 120 may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method, comprising:
receiving, by a processor, a plurality of transactions for a plurality of consumers, wherein each respective transaction of the plurality of transactions is between a consumer of the plurality of consumers and a merchant of a plurality of merchants;

automatically inputting, by the processor, the plurality of transactions into a neural network;

automatically analyzing, by the processor using the neural network, the plurality of transactions over a plurality of iterations, wherein an iteration of the plurality of iterations comprises cycling, by the processor using the neural network, through a consumer transaction history associated with the consumer, wherein the consumer transaction history has a consumer transaction sequence associated with the consumer, wherein the cycling through the consumer transaction history comprises:

retrieving, by the processor, for each transaction of the plurality of transactions, a sliding window number of transactions preceding, in the consumer transaction sequence, a transaction in the consumer transaction history, wherein the sliding window number of transactions are retrieved from a previous iteration of the plurality of iterations, wherein the sliding window number of transactions is a positive integer of transactions;

inputting, by the processor, the sliding window number of transactions preceding the transaction into the neural network as a set of transaction inputs for the transaction;

designating, by the processor and the neural network, the transaction in the consumer transaction history as a desired transaction output of the neural network associated with the set of transaction inputs for the transaction;

analyzing, by the processor and the neural network, the set of transaction inputs for the transaction to produce a generated transaction output of the neural network; and comparing, by the processor, the generated transaction output and the desired transaction output; and automatically updating, by the processor using the neural network, over the plurality of iterations, a previous fraud detection variable associated with at least one of the consumer or the merchant to generate updated fraud detection variables, in response to the analyzing the plurality of transactions.

2. The method of claim 1, wherein the cycling through the consumer transaction history further comprises:

retrieving, by the processor, the previous fraud detection variable associated with the consumer from a previous iteration of the plurality of iterations, wherein the consumer transaction history is a consumer input into the neural network;

inputting, by the processor, the previous fraud detection variable into the neural network as a desired consumer output of the neural network for the consumer;

analyzing, by the processor and the neural network, the consumer transaction history to generate a generated consumer output of the neural network; and comparing, by the processor, the generated consumer output and the desired consumer output.

3. The method of claim 1, wherein the cycling through the consumer transaction history further comprises:

retrieving, by the processor, the previous fraud detection variable associated with the merchant from a previous iteration of the plurality of iterations, wherein a merchant transaction history is a merchant input into the neural network;

inputting, by the processor, the previous fraud detection variable into the neural network as a desired merchant output for the merchant;

analyzing, by the processor and the neural network, the merchant transaction history to produce a generated merchant output of the neural network; and comparing, by the processor, the generated merchant output and the desired merchant output.

4. The method of claim 1, further comprising storing, by the processor, the updated fraud detection variables associated with at least one of the consumer or the merchant.

5. The method of claim 1, wherein the analyzing the plurality of transactions and the updating previous fraud detection variables repeat automatically such that the updated fraud detection variables associated with at least one of the consumer or the merchant are continuously generated.

6. The method of claim 1, further comprising:

receiving, by the processor, an authorization request for a transaction between the consumer and the merchant;

analyzing, by the processor, the transaction for fraud by applying an updated fraud detection variable associated with at least one of the consumer or the merchant involved in the transaction; and sending, by the processor, an authorization response in response to the analyzing the transaction.

7. An article of manufacture including a non-transitory, tangible computer readable memory having instructions stored thereon that, in response to execution by a processor, cause the processor to perform operations comprising:

receiving, by the processor, a plurality of transactions for a plurality of consumers, wherein each respective transaction of the plurality of transactions is between a consumer of the plurality of consumers and a merchant of a plurality of merchants;

automatically inputting, by the processor, the plurality of transactions into a neural network;

automatically analyzing, by the processor using the neural network, the plurality of transactions over a plurality of iterations, wherein an iteration of the plurality of iterations comprises cycling, by the processor using the neural network, through a consumer transaction history associated with the consumer, wherein the consumer transaction history has a consumer transaction sequence associated with the consumer, wherein the cycling through the consumer transaction history comprises:

retrieving, by the processor, for each transaction of the plurality of transactions, a sliding window number of transactions preceding, in the consumer transaction sequence, a transaction in the consumer transaction history, wherein the sliding window number of transactions are retrieved from a previous iteration of the plurality of iterations, wherein the sliding window number of transactions is a positive integer of transactions;

inputting, by the processor, the sliding window number of transactions preceding the transaction into the neural network as a set of transaction inputs for the transaction;

designating, by the processor and the neural network, the transaction in the consumer transaction history as a desired transaction output of the neural network associated with the set of transaction inputs for the transaction;

analyzing, by the processor and the neural network, the set of transaction inputs for the transaction to produce a generated transaction output of the neural network; and comparing, by the processor, the generated transaction output and the desired transaction output; and automatically updating, by the processor using the neural network, over the plurality of iterations, a previous fraud detection variable associated with at least one of the consumer or the merchant to generate updated fraud detection variables, in response to the analyzing the plurality of transactions.

8. The article of claim 7, wherein the cycling through the consumer transaction history further comprises:

retrieving, by the processor, the previous fraud detection variable associated with the consumer from a previous iteration of the plurality of iterations, wherein the consumer transaction history is a consumer input into the neural network;

inputting, by the processor, the previous fraud detection variable into the neural network as a desired consumer output of the neural network for the consumer;

analyzing, by the processor and the neural network, the consumer transaction history to generate a generated consumer output of the neural network; and comparing, by the processor, the generated consumer output and the desired consumer output.

9. The article of claim 7, wherein the cycling through the consumer transaction history further comprises:

retrieving, by the processor, the previous fraud detection variable associated with the merchant from a previous iteration of the plurality of iterations, wherein a merchant transaction history is a merchant input into the neural network;

inputting, by the processor, the previous fraud detection variable into the neural network as a desired merchant output for the merchant;

analyzing, by the processor and the neural network, the merchant transaction history to produce a generated merchant output of the neural network; and comparing, by the processor, the generated merchant output and the desired merchant output.

10. The article of claim 7, further comprising storing, by the processor, the updated fraud detection variables associated with at least one of the consumer or the merchant.

11. The article of claim 7, wherein the analyzing the plurality of transactions and the updating previous fraud detection variables repeat automatically such that the updated fraud detection variables associated with at least one of the consumer or the merchant are continuously generated.

12. The article of claim 7, further comprising:

receiving, by the processor, an authorization request for a transaction between the consumer and the merchant;

analyzing, by the processor, the transaction for fraud by applying an updated fraud detection variable associated with at least one of the consumer or the merchant involved in the transaction; and sending, by the processor, an authorization response in response to the analyzing the transaction.

13. A computer-based system comprising:

a processor; and a tangible, non-transitory memory configured to communicate with the processor, the tangible, non-transitory memory having instructions stored thereon that, in response to execution by the processor, cause the processor to perform operations comprising:

receiving, by the processor, a plurality of transactions for a plurality of consumers, wherein each respective transaction of the plurality of transactions is between a consumer of the plurality of consumers and a merchant of a plurality of merchants;

automatically inputting, by the processor, the plurality of transactions into a neural network;

automatically analyzing, by the processor using the neural network, the plurality of transactions over a plurality of iterations, wherein an iteration of the plurality of iterations comprises cycling, by the processor using the neural network, through a consumer transaction history associated with the consumer, wherein the consumer transaction history has a consumer transaction sequence associated with the consumer, wherein the cycling through the consumer transaction history comprises:

retrieving, by the processor, for each transaction of the plurality of transactions, a sliding window number of transactions preceding, in the consumer transaction sequence, a transaction in the consumer transaction history, wherein the sliding window number of transactions are retrieved from a previous iteration of the plurality of iterations, wherein the sliding window number of transactions is a positive integer of transactions;

inputting, by the processor, the sliding window number of transactions preceding the transaction into the neural network as a set of transaction inputs for the transaction;

designating, by the processor and the neural network, the transaction in the consumer transaction history as a desired transaction output of the neural network associated with the set of transaction inputs for the transaction;

analyzing, by the processor and the neural network, the set of transaction inputs for the transaction to produce a generated transaction output of the neural network; and comparing, by the processor, the generated transaction output and the desired transaction output; and automatically updating, by the processor using the neural network, over the plurality of iterations, a previous fraud detection variable associated with at least one of the consumer or the merchant to generate updated fraud detection variables, in response to the analyzing the plurality of transactions.

14. The computer-based system of claim 13, wherein the cycling through the consumer transaction history further comprises:

retrieving, by the processor, the previous fraud detection variable associated with the consumer from a previous iteration of the plurality of iterations, wherein the consumer transaction history is a consumer input into the neural network;

inputting, by the processor, the previous fraud detection variable into the neural network as a desired consumer output of the neural network for the consumer;

analyzing, by the processor and the neural network, the consumer transaction history to generate a generated consumer output of the neural network; and comparing, by the processor, the generated consumer output and the desired consumer output.

15. The computer-based system of claim 13, wherein the cycling through the consumer transaction history further comprises:
- retrieving, by the processor, the previous fraud detection variable associated with the merchant from a previous iteration of the plurality of iterations,
- wherein a merchant transaction history is a merchant input into the neural network;
- inputting, by the processor, the previous fraud detection variable into the neural network as a desired merchant output for the merchant;
- analyzing, by the processor and the neural network, the merchant transaction history to produce a generated merchant output of the neural network; and
- comparing, by the processor, the generated merchant output and the desired merchant output.

16. The computer-based system of claim 13, further comprising storing, by the processor, the updated fraud detection variables associated with at least one of the consumer or the merchant.

17. The computer-based system of claim 13, wherein the analyzing the plurality of transactions and the updating previous fraud detection variables repeat automatically such that the updated fraud detection variables associated with at least one of the consumer or the merchant are continuously generated.

\* \* \* \* \*